(12) United States Patent
Finkelshtain et al.

(10) Patent No.: US 6,730,350 B2
(45) Date of Patent: May 4, 2004

(54) CLASS OF ELECTROCATALYSTS AND A GAS DIFFUSION ELECTRODE BASED THEREON FOR FUEL CELLS

(75) Inventors: Gennadi Finkelshtain, Givat Ada (IL); Yuri Katzman, Hadera (IL); Mikhail Khidekel, deceased, late of Katzir (IL), by Yosef Khidekel, legal representative

(73) Assignee: Medis El Ltd., Yehud (IL)

( * ) Notice: Subject to any disclaimer, the term of this patent is extended or adjusted under 35 U.S.C. 154(b) by 351 days.

(21) Appl. No.: 09/759,230

(22) Filed: Jan. 16, 2001

(65) Prior Publication Data

US 2002/0132040 A1 Sep. 19, 2002

Related U.S. Application Data

(62) Division of application No. 09/377,749, filed on Aug. 20, 1999, now Pat. No. 6,380,126.

(51) Int. Cl.[7] .............................. B05D 5/12; H07R 43/00
(52) U.S. Cl. ............................ 427/115; 29/880; 29/885
(58) Field of Search ..................... 429/42, 40; 252/500; 427/115; 29/874, 880, 885

(56) References Cited

U.S. PATENT DOCUMENTS

| | | | |
|---|---|---|---|
| 3,423,247 A | 1/1969 | Darland, Jr. et al. | |
| 4,043,933 A | 8/1977 | Breault et al. | |
| 4,185,131 A | 1/1980 | Goller et al. | |
| 4,390,603 A | 6/1983 | Kawana | |
| 4,585,711 A | 4/1986 | Vaidyanathan | |
| 4,769,115 A | 9/1988 | Satoh et al. | |
| 4,973,391 A | 11/1990 | Masou et al. | |
| 5,032,547 A | 7/1991 | Giannelis et al. | |
| 5,051,156 A | 9/1991 | Scharifker et al. | |
| 5,068,161 A | 11/1991 | Keck et al. | |
| 5,215,820 A | 6/1993 | Hosokawa et al. | |
| 5,272,017 A | 12/1993 | Swathirajan et al. | |
| 5,292,600 A | 3/1994 | Kaufman | |
| 5,316,869 A | 5/1994 | Perry, Jr. et al. | |
| 5,334,292 A | 8/1994 | Rajeshwar et al. | |
| 5,411,573 A | 5/1995 | Kang et al. | |
| 5,523,177 A | 6/1996 | Kosek et al. | |
| 5,531,932 A | 7/1996 | Karna et al. | |
| 5,571,292 A | * 11/1996 | Sotomura et al. | .......... 29/623.5 |
| 5,604,057 A | 2/1997 | Nazri | |
| 5,631,039 A | 5/1997 | Knight et al. | |
| 5,674,644 A | 10/1997 | Nazri | |
| 5,683,828 A | 11/1997 | Spear et al. | |
| 5,702,839 A | 12/1997 | Frost et al. | |

(List continued on next page.)

OTHER PUBLICATIONS

"Chemistry Reviews", vol. 4 (1982), M.E. Vol'pin, Ed.) Inst. Of Organo–Element Compounds, Moscow, "Electron Transfer Via Charge–Transfer Complexes and Ion–Radical States: Examples of Effective and Controllable Systems" by ML Khidekel, pp 283–327.

(List continued on next page.)

Primary Examiner—Brian K. Talbot
(74) Attorney, Agent, or Firm—Mark M. Friedman

(57) ABSTRACT

An electrocatalyst based on a highly electroconducting polymer and a transition metal, in which transition metal atoms are covalently bonded to heteroatoms of the backbone monomers of the polymer. The covalently bonded transition metal atoms are nucleation sites for catalytically active transition metal particles. The complex is prepared by complexing a highly electroconducting polymer with transition metal coordination ions and then reducing the transition metal ions to neutral atoms. An electrode for a fuel cell is made by impregnating an electrically conducting sheet with the catalytic complex and drying the impregnated sheet. The scope of the present invention includes such electrodes and the fuel cells that incorporate these electrodes.

8 Claims, 7 Drawing Sheets

U.S. PATENT DOCUMENTS

| | | |
|---|---|---|
| 5,718,984 A | 2/1998 | Iwase et al. |
| 5,736,623 A | 4/1998 | Angelopoulos et al. |
| 5,776,625 A | 7/1998 | Kaufman et al. |
| 5,846,606 A | 12/1998 | Wessling |
| 5,879,828 A | 3/1999 | Debe et al. |
| 5,882,810 A | 3/1999 | Mussell et al. |
| 5,939,218 A | 8/1999 | Minuzo |
| 5,962,119 A | 10/1999 | Chan |

OTHER PUBLICATIONS

Chen et al, "The Reduction of Dioxygen and the Oxidation of Hydrogen at Polypyrrole Film Electrodes Containing Nanodispersed Platinum Particle", *J. Elecroanal. Chem.*, 350: 161–176, 1993.

Catalog of ALFA AESAR, 30 Bond St., Ward Hill, MA 01835–8099, USA.

* cited by examiner

CLASS OF ELECTROCATALYSTS AND A GAS DIFFUSION ELECTRODE BASED THEREON FOR FUEL CELLS

This application is a divisional of U.S. Ser. No. 09/377,749, filed Aug. 20, 1999 now U.S. Pat. No. 6,380,126.

FIELD AND BACKGROUND OF THE INVENTION

The present invention relates to electrochemistry and, more particularly, to a new class of electrocatalysts based on highly electroconducting polymers that have transition metal atoms covalently bonded to backbone heteroatoms, and to a gas diffusion electrode including a highly electroconducting polymer.

Like all electrochemical cells used to produce electricity, a fuel cell consists of an electrolyte sandwiched between two electrodes, a cathode and an anode. The transport of electrical charge from one electrode to another across the electrolyte allows the oxidation of a reductant at the anode and the reduction of an oxidant at the cathode without direct contact of the two reactants. The difference between a fuel cells and other such electrochemical cells is that in a fuel cell, the reactants are continuously replenished. For example, in a fuel cell that combines hydrogen gas with oxygen gas to produce electricity, the hydrogen is oxidized to $H^+$ at the anode, the oxygen is reduced to $O^{-2}$ at the cathode, the ions diffuse into the electrolyte and combine to form water, and the water diffuses out of the electrolyte.

One obvious requirement in a hydrogen-oxygen fuel cell is that the gaseous reactants must be able to diffuse into the electrodes. For this reason, these electrodes are called "gas diffusion electrodes". FIG. 1 is a sketch of a prior art gas diffusion electrode 10, in cross-section. Bonded to a surface 14 of a porous, electrically conductive support sheet 12 are many small (typically colloidal) catalytically active particles 16. The function of catalytically active particles 16 is to catalyze the anode and cathode reactions, and to conduct the electrons produced (anode) or consumed (cathode) by the reactions to (anode) or from (cathode) sheet 12. Common examples of sheet 12 include carbon paper and carbon cloth; but metal (nickel or steel) mesh sheets 12 also are known. The charge carriers of sheet 12 usually are electrons, but sheets 12 in which the charge carriers are protons also are known. Typically, catalytically active particles 16 consist of cores of activated carbon, on the surfaces of which are deposited yet smaller particles of a catalytically active transition metal such as platinum. Surface 14 is the side of electrode 10 that faces the electrolyte in a fuel cell. Particles 16 typically are embedded in a layer 18 of a hydrophobic polymer such as polytetrafluoroethylene (PTFE). The function of hydrophobic layer 18 is to repel water that is formed during the process of electrocatalysis.

Various methods are known for fabricating electrode 10. These methods are reviewed by Frost et al. in U.S. Pat. No. 5,702,839, which is incorporated by reference for all purposes as if fully set forth herein. One such method which is reviewed by Frost et al., and which includes screen printing of a co-suspension of carbon particles and particles of a hydrophobic polymer onto sheet 12, is taught by Goller et al. in U.S. Pat. No. 4,185,131, which also is incorporated by reference for all purposes as if fully set forth herein. Frost et al. then go on to teach their own method for fabricating electrode 10.

One field in which fuel cells have yet to realize their potential advantages of low cost and low pollution is that of automotive propulsion.

Internal combustion engines, in comparison with other types of engine technology such as electrical engines and engines powered by fuel cells, consume the greatest amount of fuel and also release the greatest amount of pollutants. Moreover, internal combustion engines operating on the Otto cycle have an operating efficiency of at most only 32%, while internal combustion engines operating on the Diesel cycle have an operating efficiency of at most only 40%.

Considerable effort has been expended by corporations, universities, government institutions and private individuals on finding a realistic commercial alternative to the internal combustion engine. Ideally, automobiles with such an alternative power source must be no more expensive to build and operate than vehicles with internal combustion engines. Moreover, the production of pollutants must be reduced, if not eliminated, relative to the internal combustion engine. Alternatives include electrical engines utilizing battery power, electrical engines tapping solar energy, methane gas engines and fuel cell engines. These alternatives also have been combined with internal combustion engines in hybrid vehicles. So far, no practical solution has been attained.

Fuel cells have emerged in the last decade as one of the most promising new technologies for meeting global electric power needs well into the twenty-first century. Fuel cells are inherently clean and remarkably efficient, and have been shown by the U.S. Department of Energy's Federal energy Technology Center and its industrial partners to supply electricity reliably while reducing emissions of carbon dioxide by 40 to 60 percent. Fuel cells produce negligible harmful emissions and operate so quietly that they can be used in residential neighborhoods.

Nevertheless, fuel cells have not yet provided a viable solution in the automotive field. Generally, engines using fuel cells have been too expensive to manufacture.

One important class of fuel cell is the proton exchange membrane (PEM) fuel cell, in which the electrolyte is a proton exchange membrane made of a material such as a PTFE-based ionomer such as Nafion®, available from E. I. DuPont de Namours and Company, Wilmington Del. Fuel cells of this class have much higher output power densities than fuel cells of competing classes, such as phosphoric acid liquid electrolyte fuel cells. Therefore, although PEM fuel cells operate only at relatively low temperatures, up to at most about 120° C. (vs., for example, up to 210° C. in the case of phosphoric acid liquid electrolyte fuel cells), PEM fuel cells show great promise for use in residential and small vehicle settings.

Other disadvantages of PEM fuel cells include the following:

1. The most efficient catalytic particles are platinum particles. Platinum is relatively costly.

2. Hydrogen gas for domestic use typically is produced by the reforming of natural gas. One byproduct of this reforming is carbon monoxide, which poisons platinum catalysts.

3. The efficiency of the cell depends on good electrical contact between particles 16 and sheet 12. This contact tends to be degraded over time, as a consequence of the gradual poisoning of the catalyst, and also as a consequence of environmental insults such as vibration.

Highly electroconducting polymers (HECP) are a class of polymers whose electrical resistivities are comparable to the resistivities of metals, in the range 0.1 to 100 siemens/cm. Typical examples of HECPs include polyaniline, polypyrrole, polythiophene and polyfuran. These HECPs include heteroatoms (N, N, S and O respectively) in their backbone monomers. Rajeshwar et al., in U.S. Pat. No.

5,334,292, which is incorporated by reference for all purposes as if fully set forth herein, teach an improved electrode 10 in which particles 16 and layer 18 are replaced by a layer of a HECP polymer within which catalytically active colloidal particles, for example, platinum particles as small as 10 nanometers across, are dispersed uniformly. This electrode has the following advantages over electrode 10:

1. The three-dimensional disposition of the catalytically active particles in the electrode of Rajeshwar et al. gives that electrode higher catalytic activity per unit volume, hence per unit weight, than electrode 10, in which particles 16 are distributed two-dimensionally along surface 14.

2. This increased specific catalytic activity allows the use of a smaller amount of costly catalytic materials such as platinum in the electrode of Rajeshwar et al. than in electrode 10.

3. That the catalytically active particles of Rajeshwar et al. are embedded in an electrically conductive medium (the HECP), which in turn is in contact with surface 14 all along surface 14, provides the catalytically active particles of Rajeshwar et al. with a much better electrical contact to sheet 12 than particles 16 have to sheet 12 in electrode 10.

4. The embedding of the catalytically active particles of Rajeshwar et al. in a polymer matrix also provides the electrode of Rajeshwar et al. with better mechanical stability, in terms of resistance to disruption by impact and vibration, than electrode 10.

5. It is believed that the HECP matrix provides resistance to carbon monoxide poisoning of colloidal platinum particles.

SUMMARY OF THE INVENTION

According to the present invention there is provided a heterogeneous catalyst including: (a) a highly electroconducting polymer having at least one heteroatom per backbone monomer unit thereof and a plurality of transition metal atoms covalently bonded to at least a portion of the heteroatoms.

According to the present invention there is provided a method of preparing a catalyst, including the steps of: (a) complexing a highly electroconducting polymer with a plurality of transition metal coordination complexes to produce a polymer-transition metal complex; and (b) reducing the polymer-transition metal complex to place the transition metal in a neutral oxidation state.

According to the present invention there is provided an electrode including: (a) an electrically conducting sheet; and (b) a catalytic polymer film, bonded to one side of the sheet, the catalytic polymer film including a highly electroconducting polymer having at least one heteroatom per backbone monomer unit thereof and a plurality of transition metal atoms covalently bonded to at least a portion of the heteroatoms.

According to the present invention there is provided a fuel cell including: (a) an anode; (b) a cathode; (c) an electrolyte sandwiched between the anode and the cathode; with at least one electrode, selected from the group consisting of the anode and the cathode, including: (i) an electrically conducting sheet, and (ii) a catalytic polymer film, bonded to a side of the sheet that faces the electrolyte, the catalytic polymer film including a highly electroconducting polymer having at least one heteroatom per backbone monomer unit thereof and a plurality of transition metal atoms covalently bonded to at least a portion of the heteroatoms.

According to the present invention there is provided a method for producing an electrode, including the steps of: (a) complexing a highly electroconducting polymer with a plurality of transition metal coordination complexes to produce a polymer-transition metal complex; (b) reducing the polymer-transition metal complex to place the transition metal in a neutral oxidation state; (c) dispersing the reduced polymer-transition metal complex in a solvent; and (d) impregnating an electrically conducting sheet with the dispersion.

The present invention is based on an innovative electrode that is similar to the electrode of Rajeshwar et al., but has yet smaller catalytic particles, some possibly as small as single atoms of a transition metal, dispersed within a matrix of a HECP having heteroatoms in its backbone monomers. The preferred HECPs include polyaniline, polypyrrole, polythiophene and polyfuran. The preferred transition metals include platinum, iridium, osmium, rhenium, ruthenium, rhodium, palladium, iron, cobalt, nickel, chromium, manganese, copper and vanadium. The most preferred HECPs are polyaniline and polypyrrole. The most preferred transition metals are platinum and iridium. The transition metal catalytic particles are believed to be nucleated around single transition metal atoms that are covalently bonded to some of the backbone heteroatoms of the HECPs.

The HECP-transition metal complex of the present invention is prepared by complexing the HECP, preferably in a basic form, with coordination complexes of the transition metal, and then reducing the transition metal cations of the resulting HECP-transition metal coordination complex to a neutral oxidation state. Preferably, the reduction is effected by mixing the complex with an aqueous solution of a reductant such as sodium borohydride, formaldehyde and hydrazine.

The HECP-transition metal complex of the present invention, in and of itself, constitutes a catalyst having applications beyond its primary application as a component of a fuel cell electrode. Therefore, the HECP-transition metal complex of the present invention also is referred to herein as a "catalytic HECP complex". For use in a PEM fuel cell electrode, the catalytic HECP complex of the present invention preferably includes a polytetrafluoroethylene (PTFE)-based ionomer. Optionally, the catalytically active transition metal particles of the present invention are supplemented by prior art catalytically active particles 16, deposited on surface 14 of sheet 12 by the methods of the prior art, for example, by screen-printing a paste of particles 16 onto surface 14. Following this deposition, sheet 12 is impregnated with a dispersion of the catalytic HECP complex of the present invention in a solvent, and is subsequently dried. Preferred solvents include xylene, chloroform, toluene and m-cresol, and the dispersion is stabilized by a stabilizer such as a sulfonic acid.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a catalytic HECP complex that includes catalytically active transition metal particles nucleated around transition metal atoms covalently bound to backbone heteroatoms thereof. The present invention can be used as a component of an electrode in a PEM fuel cell. The scope of the present invention also includes an electrode that incorporates the catalytic HECP complex, a fuel cell that includes the electrode, and method of preparing the catalytic HECP complex and the electrode.

The principles and operation of a catalytic HECP complex according to the present invention may be better understood with reference to the drawings and the accompanying description.

Figure 2A:
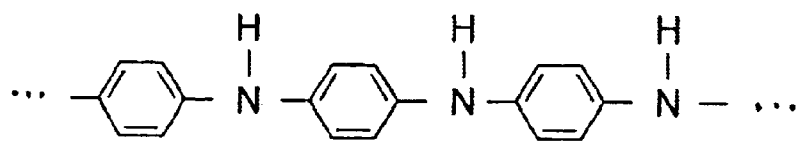
FIG. 2 shows three of the steps in the preparation of a polyaniline-platinum complex.
Figure 2B:
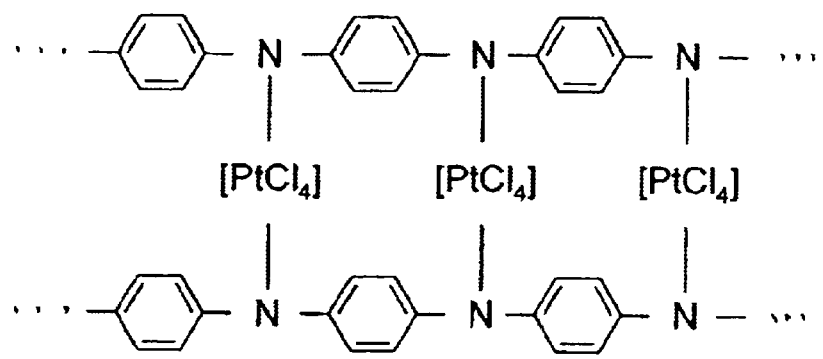
Figure 2C:
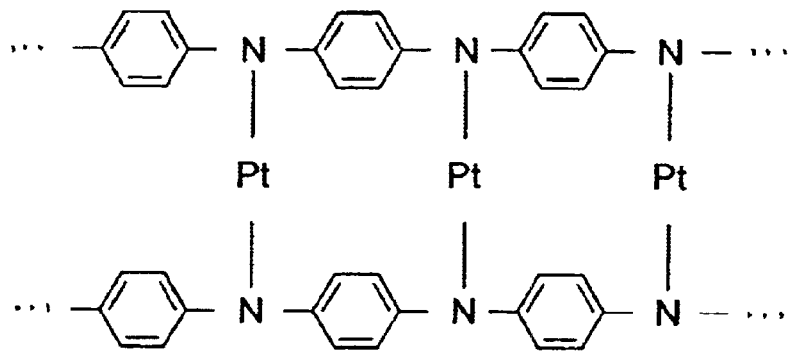

Referring again to the drawings, FIG. 2 shows three of the steps in the preparation of one of the most preferred embodiments of the catalytic HECP complex of the present invention, in which the HECP is polyaniline and the transition metal is platinum. FIG. 2A shows a polyaniline chain. FIG. 2B shows a complex of polyaniline with $PtCl_4$ coordination complexes. FIG. 2C shows the complex of FIG. 2B after reduction of the $Pt^{+4}$ of FIG. 2B to $Pt^0$.

Figure 1:
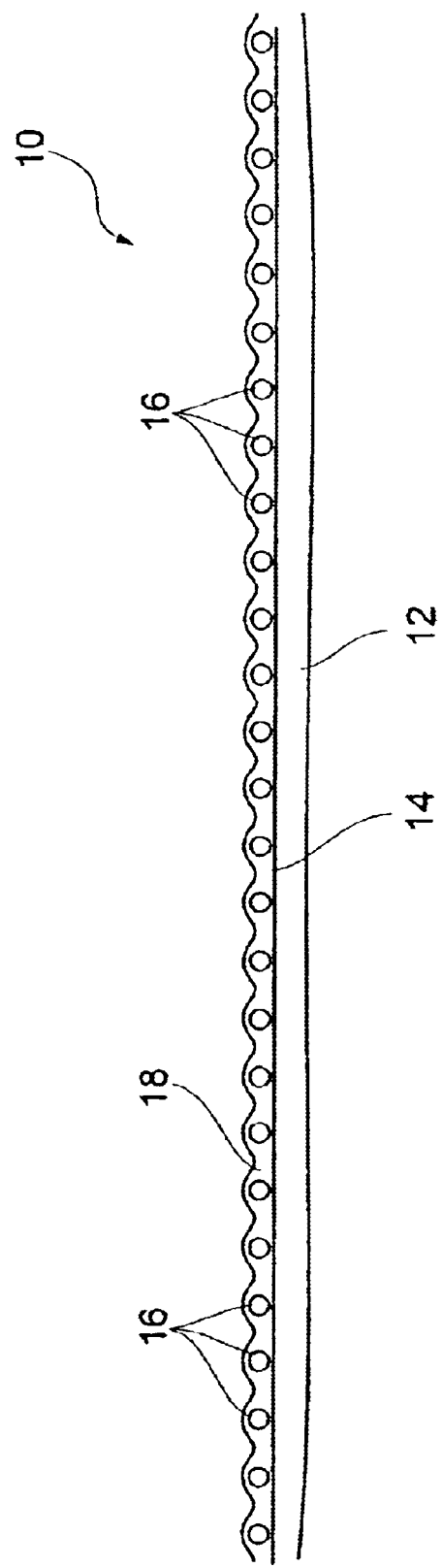
FIG. 1 shows a prior art gas diffusion electrode.

FIG. 1B of Rajeshwar et al. serves to illustrate, schematically, an electrode of the present invention. What Rajeshwar et al. label as a "microporous film" should be understood as the catalytic HECP complex of the present invention. The particles labeled "Catalyst" by Rajeshwar et al. are to be understood as the catalytically active transition metal particles of the present invention, not drawn to scale, as many the catalytically active particles of the present invention are believed to be only several atoms in size, or even as small as a single atom.

Figure 3:
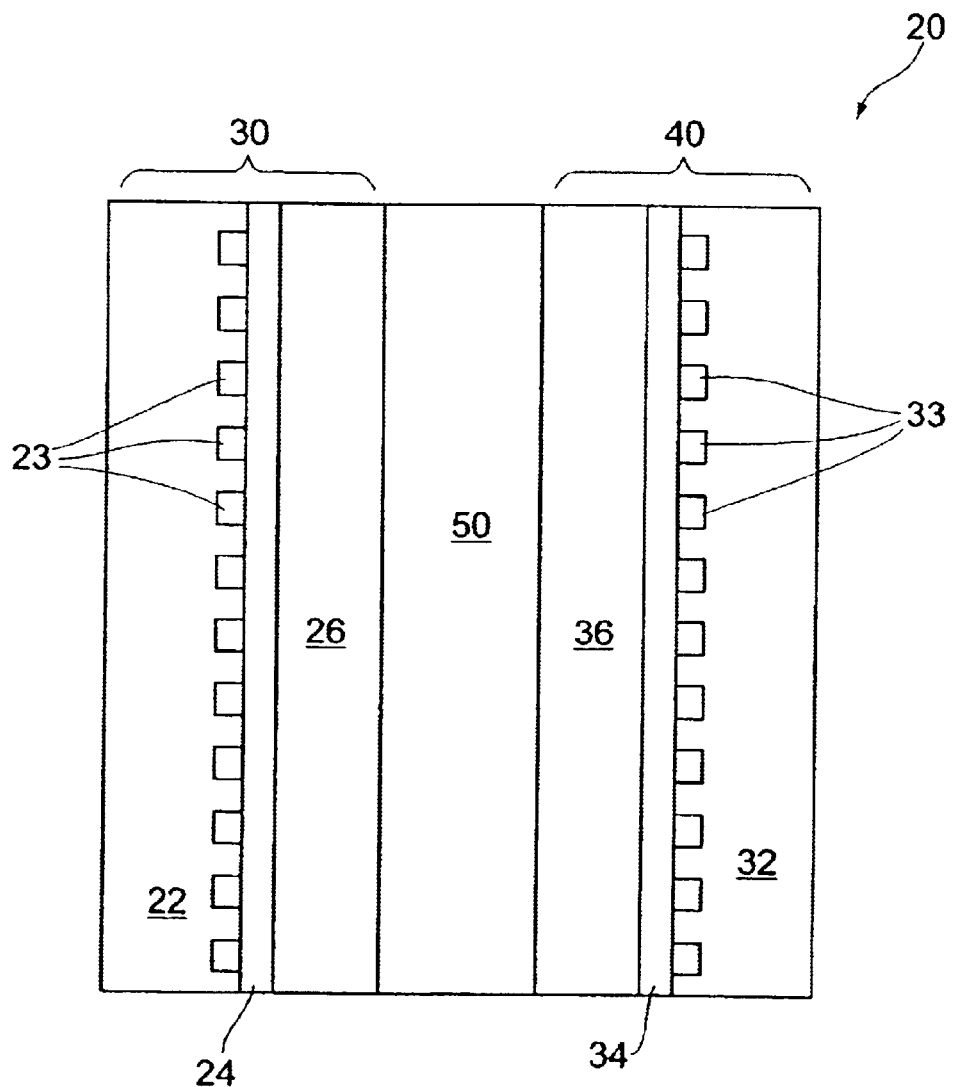
FIG. 3 is a schematic illustration of a PEM fuel cell of the present invention.

FIG. 3 shows, schematically, a PEM fuel cell 20 of the present invention. Fuel cell 20 consists of a PEM electrolyte 50 sandwiched between an anode 30 and a cathode 40. Anode 30 consists of a graphite plate 22 bearing a carbon sheet 24. The side of carbon sheet 24 that faces electrolyte 50 is covered by a layer of catalytic HECP complex 26. Similarly, cathode 40 consists of a graphite plate 32 bearing a carbon sheet 34. The side of carbon sheet 34 that faces electrolyte 50 is covered by a layer of catalytic HECP complex 36. The side of graphite plate 22 that bears carbon sheet 24 includes grooves 23 for admitting hydrogen gas. Similarly, the side of graphite plate 32 that bears carbon sheet 34 includes grooves 33 for admitting oxygen gas.

In the examples presented below, the HECPs are polyaniline and polypyrrole. Polyaniline was prepared as described by X. Wei and A. Epstein, "Synthesis of highly sulfonated polyaniline", *Synthetic Metals*, vol. 74 pp. 123–125 (1995). $(NH_4)_2S_2O_8$ was used as an oxidizer. Polypyrrole was prepared as described in T. H. Chao and J. March, "A study of polypyrrole synthesized with oxidative transition metal ions", *Journal of Polymer Science, Part A: Polymer Chemistry*, vol. 26 pp. 743–753 (1988). $FeCl_3$ was used as an oxidizer.

The first four examples are of catalytic HECP complexes of the present invention. The last nine examples are of electrodes that incorporate the catalytic HECP complex of the present invention.

EXAMPLE 1

5.12 g of polyaniline powder (in basic form) and 100 ml of distilled water were mixed in an Erlenmeyer flask for 30 minutes to prepare an aqueous suspension of polyaniline. 110 ml of 0.98% aqueous $H_2PtCl_6$ were slowly added to this suspension over the course of 60 minutes while stirring constantly. The resulting polyaniline-$PtCl_4$ complex was separated by centrifuging and decanting. The resulting solid filtrate was colorless, unlike the initial polyaniline suspension, which was yellow, showing that the $H_2PtCl_6$ had reacted with the polyaniline. The filtrate was rinsed with distilled water until the rinse water had a pH of 7.

A reductant solution was prepared by dissolving 1.5 g $NaBH_4$ and 0.7 g NaOH in 100 ml of distilled water at room temperature with stirring for 30 minutes. The polyaniline-$PtCl_4$ complex filtrate was placed in an Erlenmeyer flask, and the reductant solution was added dropwise while stirring over the course of 2 hours and heating gently, to no more than 60° C. The product of this reaction was rinsed with distilled water until the rinse water had a pH of 7, and then was dried at 110° C. for 24 hours.

EXAMPLE 2

As in example 1, 4.73 g of polyaniline were suspended in 100 ml of distilled water. 80 ml of 1.15% aqueous $H_2IrCl_6$ were added slowly to the polyaniline suspension over the course of 60 minutes while stirring constantly. The resulting polyaniline-$IrCl_4$ complex was separated by centrifuging and decanting. The resulting solid was rinsed with distilled water until the rinse water had a pH of 7.

The reductant solution of Example 1 was added to the polyaniline-$IrCl_4$ complex over the course of 2 hours at a temperature of 60° C. The product of this reaction was rinsed with distilled water until the rinse water had a pH of 7, and then was dried at 110° C. for 24 hours.

EXAMPLE 3

4.90g of polypyrrole powder were suspended in 100 ml of distilled water. 105 ml of 0.98% aqueous $H_2PtCl_6$ were added to the polypyrrole suspension over the course of 60 minutes while stirring constantly. The resulting polypyrrole-$PtCl_4$ complex was separated by centrifuging and decanting. The resulting solid was rinsed with distilled water until the rinse water had a pH of 7.

The reductant solution of Example 1 was added to the polypyrrole-$PtCl_4$ complex at a temperature of 60° C. over the course of 2 hours. The product of this reaction was rinsed with distilled water until the rinse water had a pH of 7, and then was dried at 110° C. for 24 hours.

EXAMPLE 4

As in example 3, 3.92 g of polypyrrole powder were suspended in 100 ml of distilled water. 70 ml of 1.15% aqueous $H_2IrCl_6$ were added to the polypyrrole suspension over the course of 60 minutes while stirring constantly. The resulting polypyrrole-$IrCl_4$ complex was separated by centrifuging and decanting. The resulting solid was rinsed with distilled water until the rinse water had a pH of 7.

A reductant solution was prepared by dissolving 1.3 g $NaBH_4$ and 0.6 g NaOH in 100 ml of distilled water at room temperature with stirring for 30 minutes. This reductant solution was added to the polypyrrole-$IrCl_4$ complex over the course of 2 hours at a temperature of 60° C. The product of this reaction was rinsed with distilled water until the rinse water had a pH of 7, and then was dried at 110° C. for 24 hours.

Table 1 shows the rate of oxygen gas liberation (cm³ per mg metal (Pt or Ir) per hour at room temperature and atmospheric pressure) from 20 ml of 10% $H_2O_2$ per gram of several catalysts: three prior art catalysts and the four catalysts of Examples 1–4.

TABLE 1

| catalyst | mass (g) | rate of $O_2$ release |
| --- | --- | --- |
| 10% Pt/polypyrrole of Rajeshwar et al. | 0.16 | 0.7 |
| Polyaniline-Pt of Example 1 | 0.12 | 6.7 |
| Polyaniline-Ir of Example 2 | 0.15 | 2.2 |
| Polypyrrole-Pt of Example 3 | 0.15 | 17.3 |
| Polypyrrole-Ir of Example 4 | 0.16 | 3.1 |

In examples 5–11, suspensions of HECP-transition metal complexes were prepared by adding a stabilizer to the HECP-transition metal complex, along with sufficient organic solvent to produce a paste-like mixture. Electrodes 24 and 34 were fabricated on Toray® Teflon®-treated carbon sheets, available from Electrochem, Inc. of Woburn Mass. The paste-like mixture was applied to the sheets by screen printing, and the sheets were dried at 120° C. for 5 hours. The platinum content of the resulting impregnated sheets was 0.25 mg/cm². Circular discs 2.5 cm in diameter (4.9 cm in area) were cut from the impregnated carbon sheets PEMs 3.5 cm in diameter, to serve as electrolyte 50, were cut from a Nafion®-117 sheet.

Membrane-electrode assemblies (MEAs) that emulate fuel cell 20 were fabricated as sandwich structures of PEMs between impregnated carbon sheets, sintered in a heated press tool by hot pressing. The MEAs were tested in a standard hydrogen-oxygen fuel cell. All tests were conducted at a constant gas pressure $P_{H_2}=P_{O_2}=40$ psig. Voltage-current curves of the MEAs were measured in the range 0.3 V to 0.8 V.

As a control, example 12 used electrodes 24 and 34 prepared as taught by Rajeshwar et al., using colloidal platinum in polypyrrole.

Table 2 presents the results of examples 5–12. The current densities I are given for a voltage of 0.5 V.

TABLE 2

| example | catalyst | solvent | stabilizer | I (amp/cm²) |
| --- | --- | --- | --- | --- |
| 5 | 2.94 g PPy-Pt complex | xylene | 0.29 g DBSA | 0.65 |
| 6 | 4.31 g PAni-Pt complex | xylene | 0.43 g DBSA | 0.98 |
| 7 | 2.40 g PAni-Pt complex | m-cresol | 0.24 g CSA | 0.84 |
| 8 | 4.37 g PAni-Pt complex | ethanol | 0.44 g Nafion | 1.22 |
| 9 | 5.05 g PPy-Pt complex | chloroform | 0.51 g DBSA | 0.60 |
| 10 | 4.52 g PPy-Pt complex | m-cresol | 0.45 g CSA | 0.56 |
| 11 | 3.94 g PAni-Pt complex | toluene | 0.40 g DBSA | 0.93 |
| 12 | 3.18 g PPy-Pt of Rajeshwar et al. | xylene | 0.32 g DBSA | 0.39 |

Notes:
PAni = Polyaniline
PPy = Polypyrrole
DBSA = dodecylbenzenesulfonic acid
CSA = camphorsulfonic acid
Nafion = 5% ethanol solution of Nafion ®
p-toluenesulfonic acid also is suitable as a stabilizer.

Figure 4B:
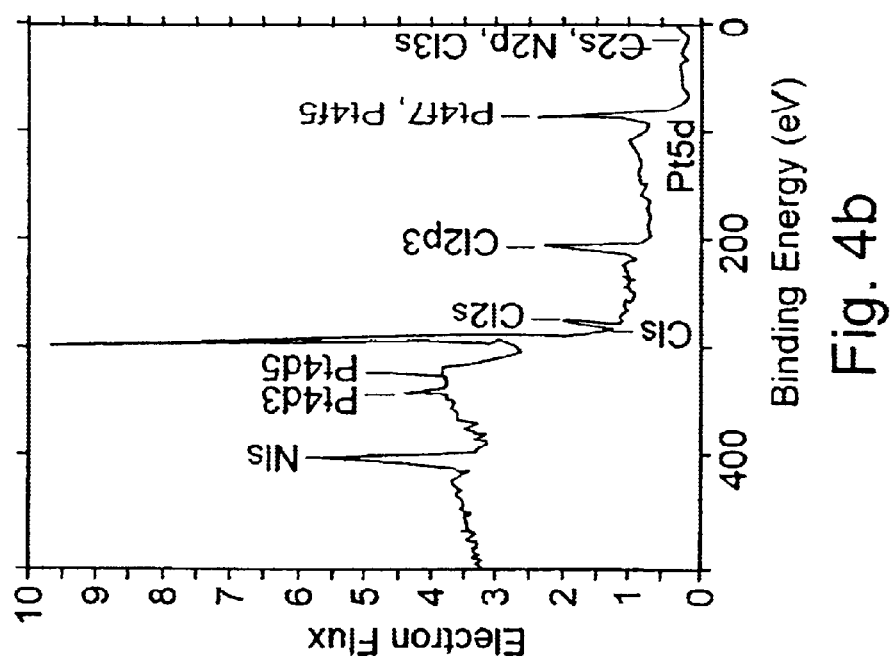
FIG. 4B is an x-ray photoelectron spectrum of a polyaniline-platinum complex.
Figure 4A:
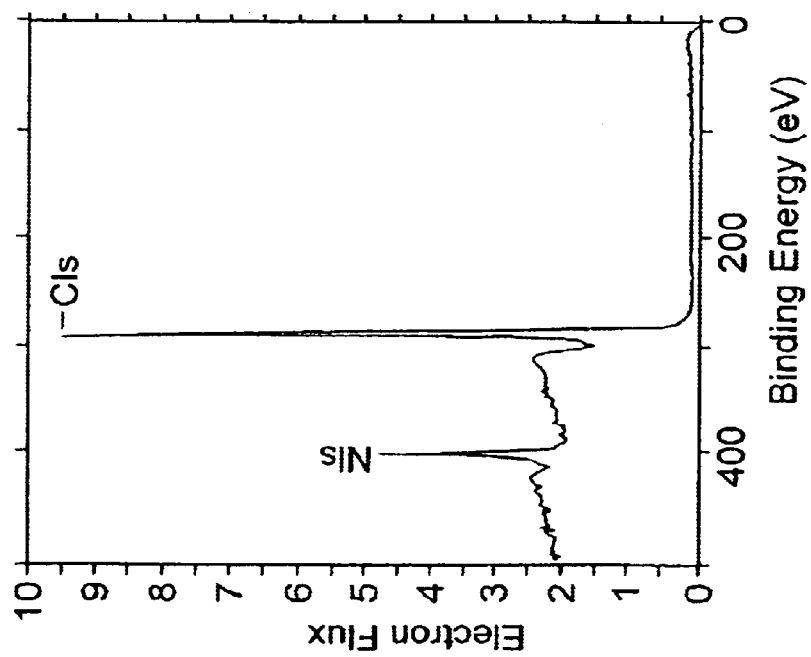
FIG. 4A is an x-ray photoelectron spectrum of polyaniline.
Figure 5:
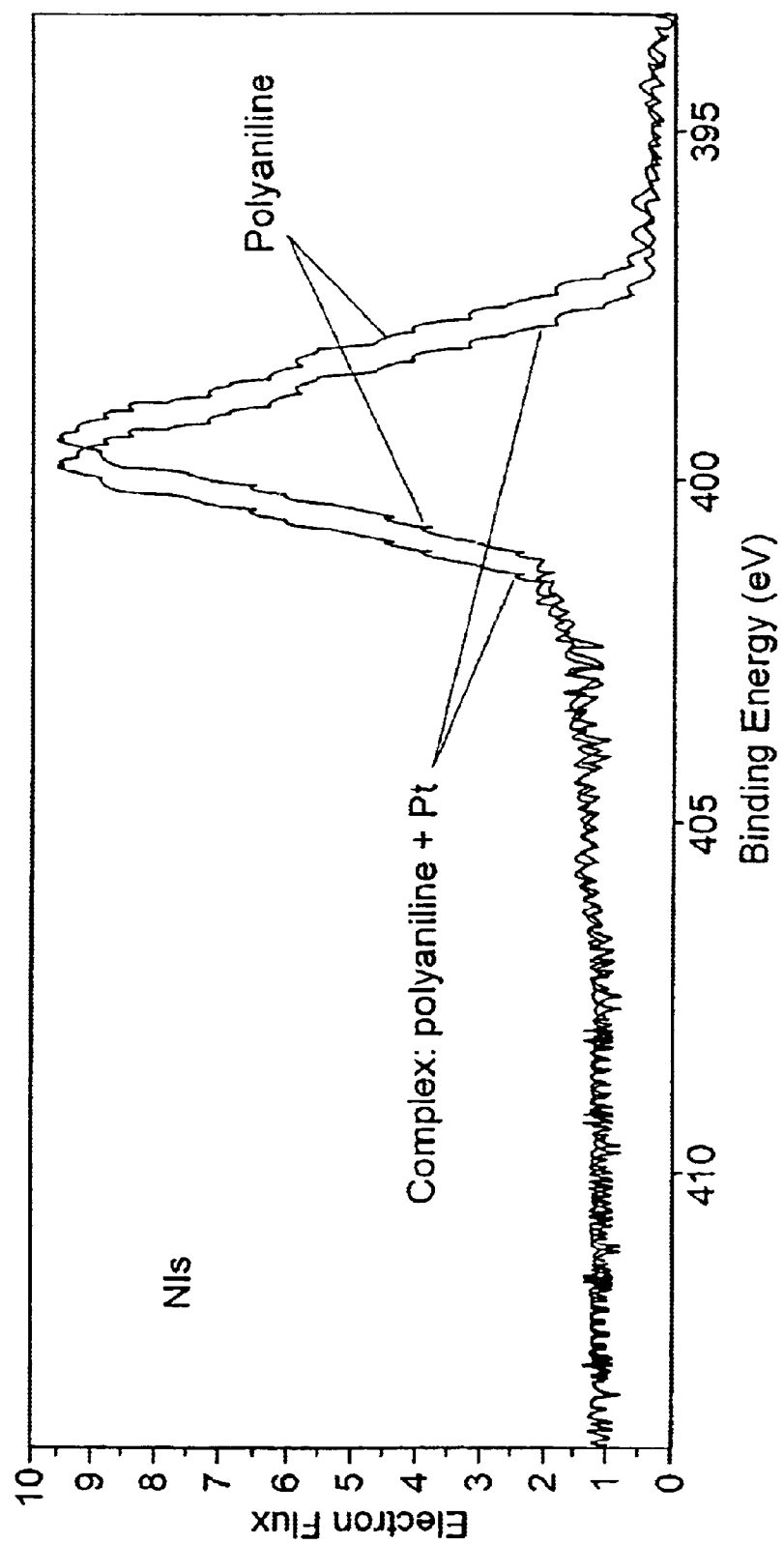
FIG. 5 is an enlarged superposition of the nitrogen 1s lines of the spectra of FIGS. 4A and 4B.

FIGS. 4–6 show measurements conducted on the polyaniline-platinum complex of example 1, and on a control sample of polyaniline, that demonstrate that the platinum is indeed covalently bonded to the polyaniline.

FIGS. 4A and 4B are x-ray photoelectron spectra of polyaniline and of the polyaniline-platinum complex of example 1, respectively. The spectra were recorded at the Wolfson Applied Materials Research Center of Tel Aviv, Israel, using a Scanning AES/XPS Multitechnique System of PHI, and interpreted according to J. F. Moulder, *Handbook of X-ray Photoelectron Spectroscopy*, Perkin-Elmer, 1992. The spectral lines are labeled by the atomic orbitals that are the sources of the photoelectrons. The ordinates are electron flux, in arbitrary units.

FIG. 5 is a horizontally expanded superposition of the nitrogen 1s lines of FIGS. 4A and 4B. The nitrogen 1s line of the polyaniline-platinum complex is shifted upward in binding energy relative to the nitrogen 1s line of polyaniline.

Figure 6A:
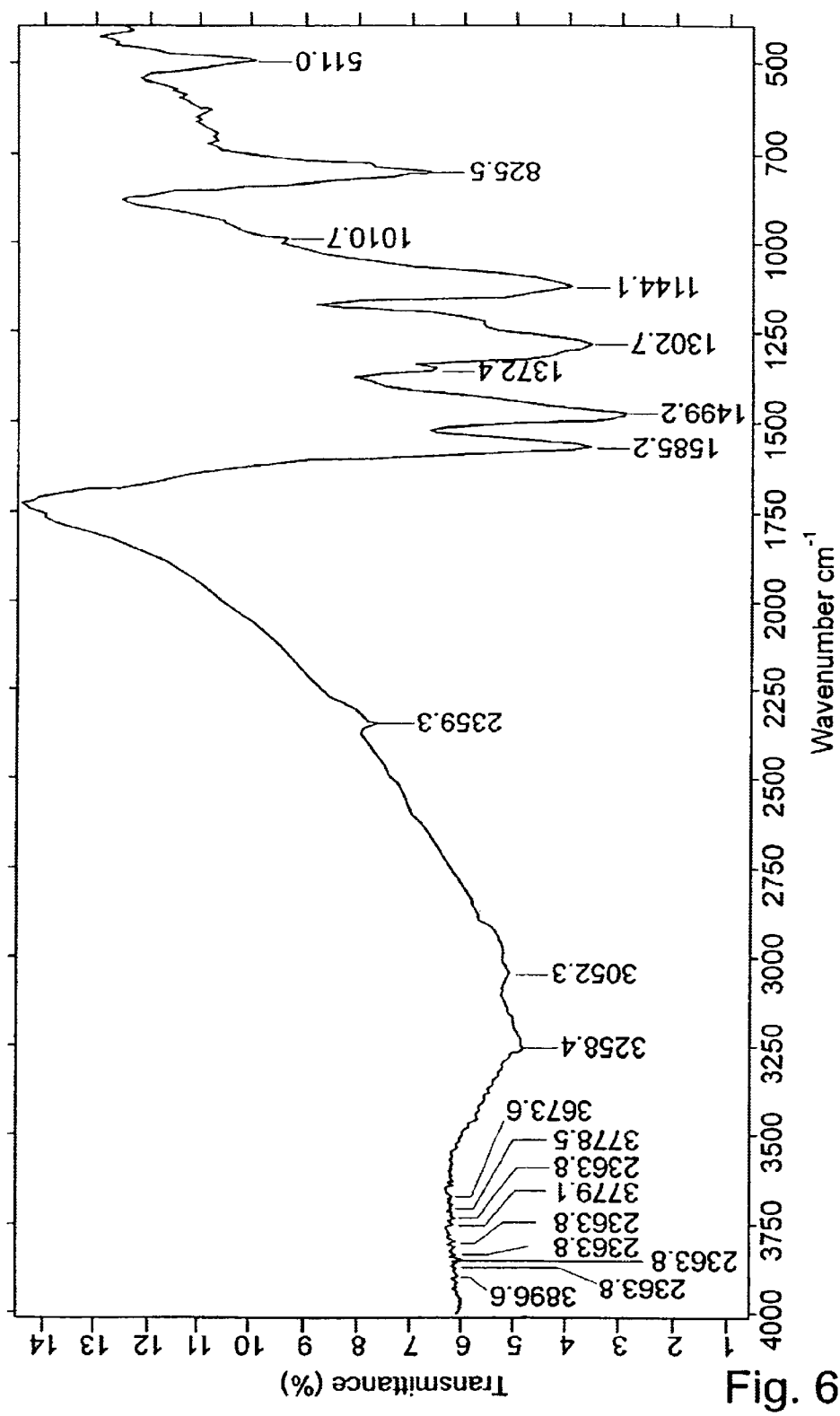
FIG. 6A is an infrared spectrum of polyaniline.
Figure 6B:
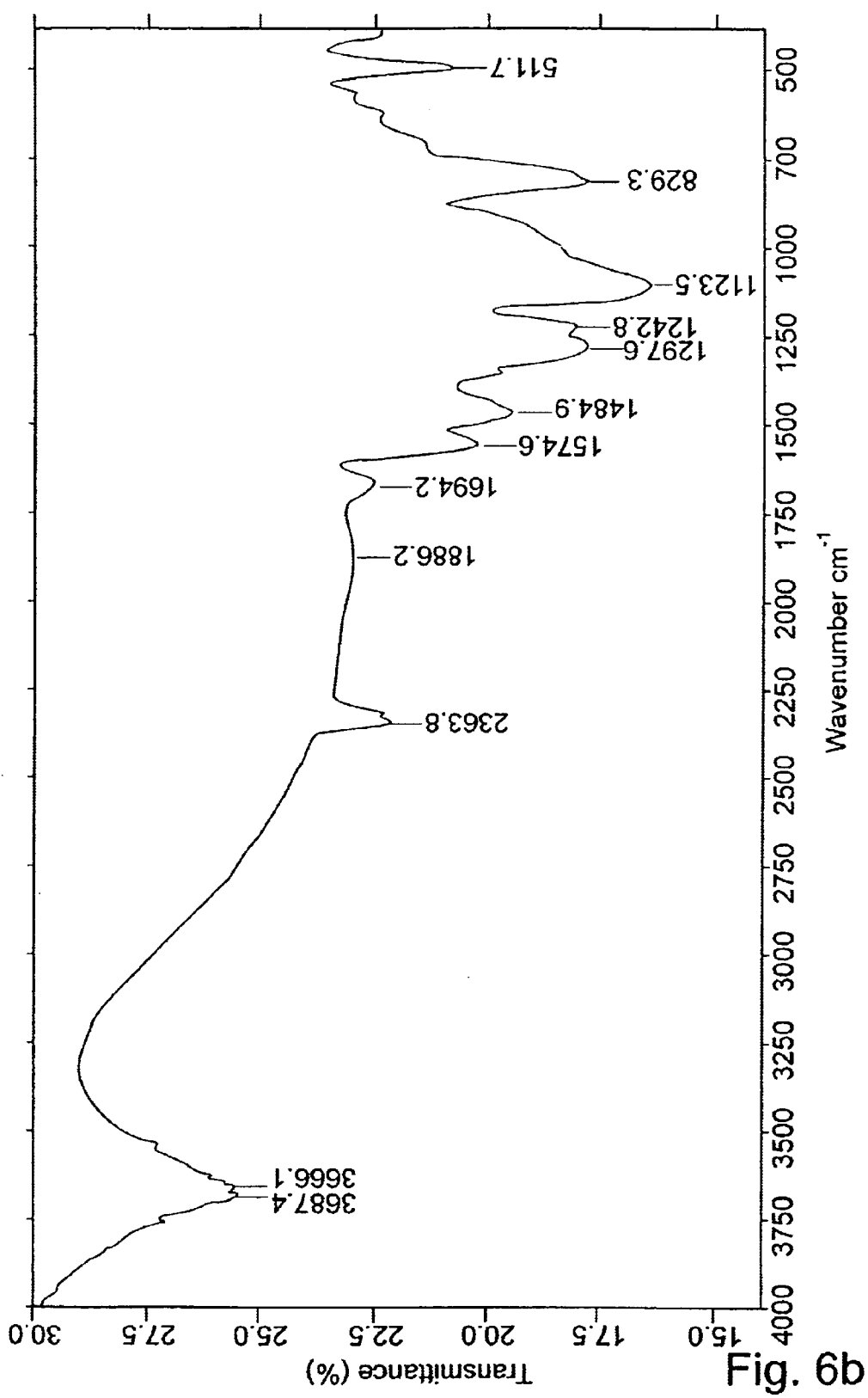
FIG. 6B is an infrared spectrum of a polyaniline-platinum complex.

FIGS. 6A and 6B are infrared spectra of polyaniline and of the polyaniline-platinum complex of example 1, respectively. The spectra were recorded at the Chemistry Faculty of Tel Aviv University, Israel, using a Vector-22 IR spectrometer of Bruker Instruments, Inc., and interpreted according to Silverstein, Bassler and Morill, Spectrometric Identification of Organic Compounds, John Wiley and Sons, 1981. The spectral lines in FIGS. 6A and 6B belong to aromatic amines. The marked change in character between the two infrared spectra shows that the platinum of the polyaniline-platinum complex is indeed covalently bonded to the polyaniline.

While the invention has been described with respect to a limited number of embodiments, it will be appreciated that many variations, modifications and other applications of the invention may be made.

What is claimed is:

1. A method for producing an electrode, comprising the steps of:
    (a) complexing a highly electroconducting polymer with a plurality of transition metal coordination complexes to produce a polymer-transition metal complex;
    (b) reducing said polymer-transition metal complex to place said transition metal in a neutral oxidation state;
    (c) dispersing said reduced polymer-transition metal complex in a solvent; and
    (d) impregnating an electrically conducting sheet with said dispersion.

2. The method of claim 1, further comprising the step of:
    (e) drying said impregnated sheet.

3. The method of claim 1, further comprising the step of:
    (e) binding a plurality of catalytically active particles to said electrically conducting sheet prior to said impregnating of said electrically conducting sheet with said dispersion.

4. The method of claim 2, wherein said binding is effected by steps including:
    (i) forming a paste of said catalytically active particles in a carrier;
    (ii) applying said paste to said sheet;
    (iii) drying said sheet whereto said paste has been applied; and
    (iv) sintering said dried sheet.

5. The method of claim 4, wherein said paste is applied to said sheet by screen printing.

6. The method of claim 1, wherein said solvent is selected from the group consisting of xylene, chloroform, toluene and m-cresol.

7. The method of claim 1, wherein said dispersing of said highly electroconducting polymer in said solvent is facilitated by the step of adding a stabilizer to said solvent.

8. The method of claim 7, wherein said stabilizer is a sulfonic acid.

* * * * *